(12) United States Patent
Rohrer et al.

(10) Patent No.: US 11,515,751 B2
(45) Date of Patent: Nov. 29, 2022

(54) HOUSING ARRANGEMENT FOR A BLOWER MOTOR

(71) Applicants: DENSO AUTOMOTIVE Deutschland GmbH, Eching (DE); DENSO CORPORATION, Kariya (JP)

(72) Inventors: Christof Rohrer, Eching (DE); Andreas Wolf, Eching (DE); Halil Yilmaz, Eching (DE); Maninder Singh, Eching (DE); Ilja Maljawin, Eching (DE); Claus Busl, Eching (DE)

(73) Assignee: DENSO AUTOMOTIVE Deutschland GmbH, Eching (DE)

( * ) Notice: Subject to any disclaimer, the term of this patent is extended or adjusted under 35 U.S.C. 154(b) by 958 days.

(21) Appl. No.: 16/250,205

(22) Filed: Jan. 17, 2019

(65) Prior Publication Data

US 2019/0238026 A1    Aug. 1, 2019

(30) Foreign Application Priority Data

Jan. 26, 2018   (DE) .......................... 102018101761.8

(51) Int. Cl.
*H02K 5/24* (2006.01)
*F04D 25/06* (2006.01)
*H02K 7/14* (2006.01)
*F04D 29/66* (2006.01)

(52) U.S. Cl.
CPC ............... *H02K 5/24* (2013.01); *F04D 25/06* (2013.01); *H02K 7/14* (2013.01); *F04D 29/668* (2013.01)

(58) Field of Classification Search
CPC .......... H02K 5/24; H02K 7/14; F04D 29/668; F04D 25/06; F04D 29/4206
See application file for complete search history.

(56) References Cited

U.S. PATENT DOCUMENTS

| 3,939,369 A * | 2/1976 | Sullivan ................ F02N 11/12 |
| | | 123/185.7 |
| 5,786,647 A | 7/1998 | Vollmer et al. |
| 5,868,384 A | 2/1999 | Anderson |
| 6,098,948 A | 8/2000 | Boucheret |

(Continued)

FOREIGN PATENT DOCUMENTS

| AT | 1975 U2 | 2/1998 | |
| CN | 204145162 U * | 2/2015 | ............... H02K 5/02 |

(Continued)

*Primary Examiner* — Jeremy A Luks
(74) *Attorney, Agent, or Firm* — Harness, Dickey & Pierce, P.L.C.

(57) ABSTRACT

A housing arrangement has a blower motor including a rotation shaft that traverses through an underside and a topside of the blower motor, the rotation shaft being configured to mount a fan impeller thereupon, a first housing part that receives the blower motor, a second housing part that covers the blower motor received in the first housing part, a first decoupling unit arranged circumferentially between the underside of the blower motor and an inner bottom of the first housing part, and a second decoupling unit arranged circumferentially between the topside of the blower motor and an inner surface of the second housing part. Here, the spring stiffness of the first and the second decoupling units are substantially constant in an axial direction, a radial direction, or a normal direction.

14 Claims, 2 Drawing Sheets

(56) References Cited

U.S. PATENT DOCUMENTS

| | | |
|---|---|---|
| 6,202,899 B1 | 3/2001 | Lasserre et al. |
| 2003/0080635 A1 | 5/2003 | Bacile et al. |
| 2014/0197299 A1 | 7/2014 | Oppenheimer et al. |
| 2017/0093233 A1 | 3/2017 | Li et al. |
| 2017/0093249 A1 | 3/2017 | Li et al. |
| 2017/0093259 A1 | 3/2017 | Li et al. |
| 2017/0093260 A1 | 3/2017 | Li et al. |

FOREIGN PATENT DOCUMENTS

| | | | | |
|---|---|---|---|---|
| DE | 4107049 A1 | 9/1992 | | |
| DE | 4136485 A1 | 5/1993 | | |
| DE | 4334124 A1 | 9/1994 | | |
| DE | 102004017300 A1 * | 11/2005 | ............... | H02K 5/24 |
| DE | 102014224900 A1 | 6/2016 | | |
| EP | 2495446 A1 | 9/2012 | | |
| FR | 2732524 A1 | 10/1996 | | |
| JP | H11-285656 A | 10/1999 | | |
| JP | 6105800 B1 * | 3/2017 | ............... | H02K 5/00 |
| JP | 2017070201 A | 4/2017 | | |

* cited by examiner

_Fig.2_
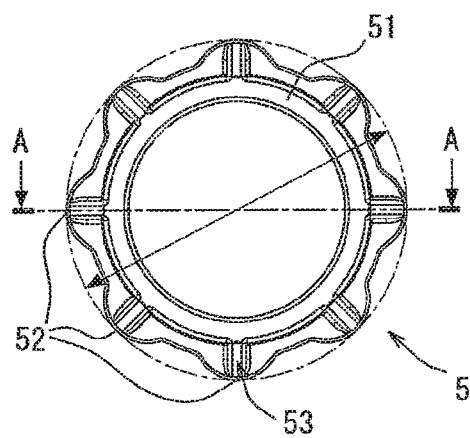
_Fig.3_
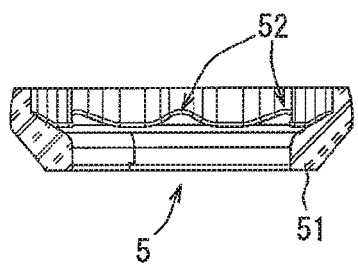
_Fig.4_
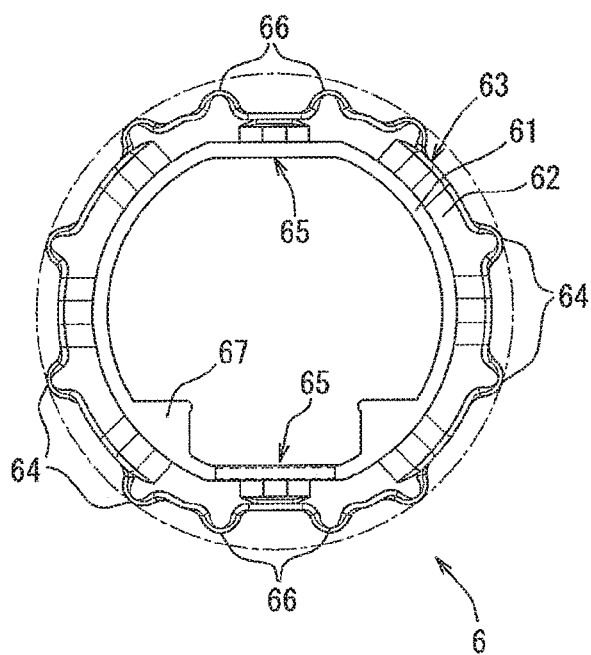
_Fig.5_
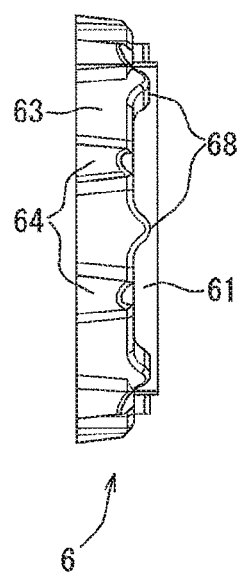

HOUSING ARRANGEMENT FOR A BLOWER MOTOR

CROSS REFERENCE TO RELATED APPLICATIONS

The present application claims the benefit of priority from German Patent Application No. 102018101761.8 filed on Jan. 26, 2018, the disclosure of which is incorporated herein by reference.

TECHNICAL FIELD

The present disclosure relates to a housing arrangement for a blower motor.

BACKGROUND

A housing arrangement for a blower motor may be provided, for example, for use in a vehicle climatization device. When in operation, vibrations from the blower motor may transmit via a housing to neighboring components. Structure-borne noise, particularly in a vehicle climatization device, may be considered irritating and therefore it may be desirable to decouple the transmission of such noise from neighboring components.

SUMMARY

According to one aspect of the present disclosure, a housing arrangement has a blower motor including a rotation shaft that traverses through an underside and a topside of the blower motor, the rotation shaft being configured to mount a fan impeller thereupon, a first housing part that receives the blower motor, a second housing part that covers the blower motor received in the first housing part, a first decoupling unit arranged circumferentially between the underside of the blower motor and an inner bottom of the first housing part, and a second decoupling unit arranged circumferentially between the topside of the blower motor and an inner surface of the second housing part. Here, the spring stiffness of the first and the second decoupling units are substantially constant in an axial direction, a radial direction, or a normal direction.

BRIEF DESCRIPTION OF THE DRAWINGS

The disclosure, together with additional objectives, features and advantages thereof, will be best understood from the following description, the appended claims and the accompanying drawings, in which:

FIG. 2 shows a top view of the first decoupling unit according to the exemplary embodiment;

FIG. 3 shows a sectional view of the first decoupling unit according to FIG. 2 along the line A-A;

FIG. 4 shows a top view of the second decoupling unit according to the exemplary embodiment;

FIG. 5 shows a side view of the second decoupling unit according to FIG. 4.

DETAILED DESCRIPTION

Figure 1:
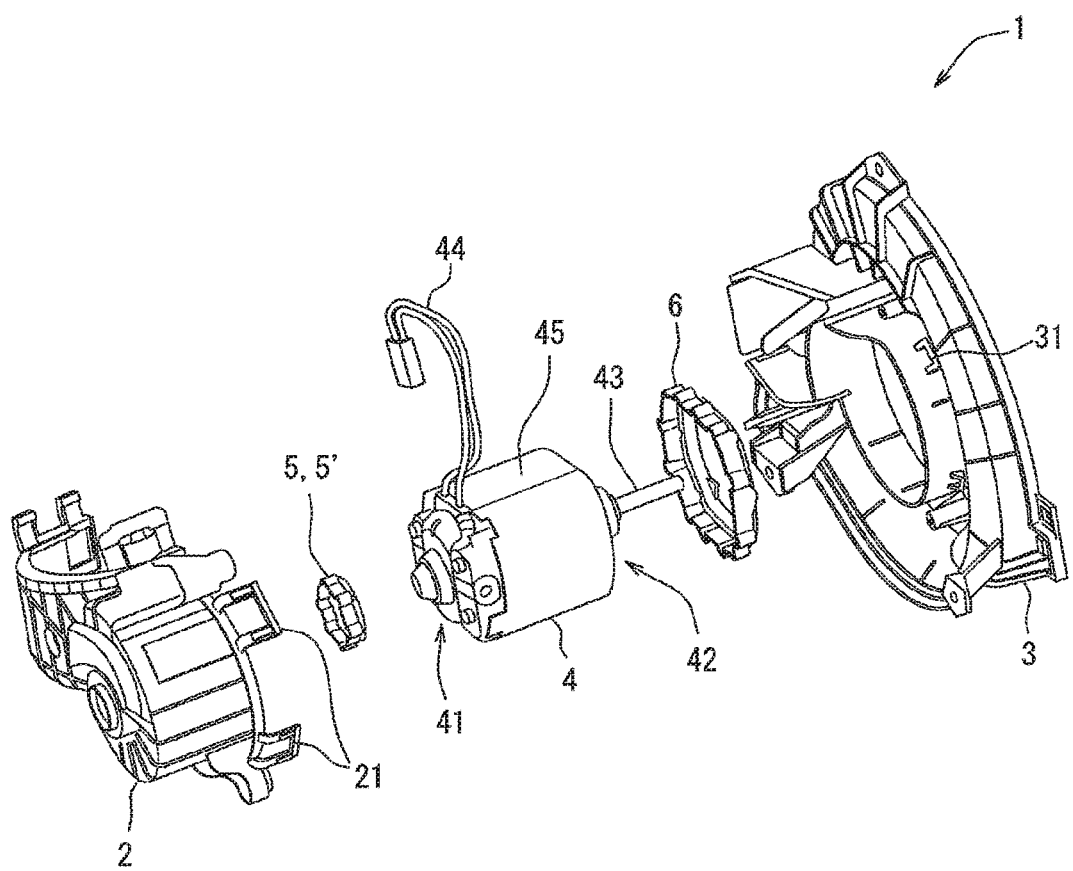
FIG. 1 shows an exploded view of a housing arrangement according to an exemplary embodiment.

FIG. 1 shows an exploded view of a housing arrangement 1 according to an exemplary embodiment of the present disclosure. The housing arrangement 1 includes two housing half shells, which are designated as first housing part 2 and second housing part 3. The first housing part 2 is adapted for receiving a blower motor 4. The second housing part 3 is adapted for covering the received blower motor 4. To decouple the underside 41 of the blower motor 4 downwards from the first housing part 2, a first decoupling unit in the form of a first decoupling ring 5 is arranged therebetween. To decouple the topside 42 of the blower motor 4 upwards from the second housing part 3, a second decoupling unit in the form of a second decoupling ring 6 is arranged therebetween. For the sake of simplicity, the decoupling units will hereinafter be called first and second decoupling rings 5, 6. They will be explained in greater detail later with reference to the FIGS. 2 to 5. It should be noted that in this context, the term "decoupling" refers to the reduction or prevention of undesired mechanical coupling between components, for example, in order to reduce or prevent transmission of noise, vibrations, etc., including noise and vibrations of particular frequencies or orders of frequencies.

The blower motor 4 has a shaft 43, which ends centrally in the area of the underside 41 and projects out centrally from the topside 42, such that a fan impeller (not shown) can be placed upon this free end. Alternatively, double blowers are known in which the shaft 43 projects from the blower motor 4 on both sides, such that a fan impeller can be mounted to both ends. The first decoupling ring 5 is arranged circumferentially between the underside 41 of the blower motor 4 and the inner bottom of the first housing part 2. The end point of the shaft 43 on the underside 41 coincides with the mid-point of the first decoupling ring 5.

The second decoupling ring 6 is arranged circumferentially between the topside 42 of the blower motor 4 and the inner surface of the second housing part 3. The shaft 43 penetrates the mid-point of the second decoupling ring 6 and protrudes from an opening of the second housing part 3, such that the fan impeller can be attached above the same.

Deviating from a rotationally symmetric shape, the blower motor 4 comprises two diametrically opposite flat portions, of which only the flat portion 45 facing the viewer is visible in FIG. 1.

In the assembled state, engagement elements 21 on the first housing part 2 engage with respective counter-engagement elements 31 on the second housing part 3, such that the blower motor 4 is mounted in a state of being capable of oscillating between the two housing parts 2, 3 and the decoupling rings 5, 6.

The first exemplary embodiment is based on decoupling units 5, 6 made of an elastic polymer. Alternatively, according to an embodiment variant, an alternative decoupling ring 5', which is made of two or more layers of material of different elasticity, can be used instead of the first decoupling ring 5. Such two-component parts could optionally fine-tune the elastic property of the decoupling ring 5.

The housing arrangement 1 is intended for integration in the air-conditioning device of a vehicle climatization device (not shown). The housing arrangement 1 is for this purpose connected with other housing parts. For example, the blower motor 4 includes electric cabling 44, which is appropriately connected accordingly based on design requirements.

The design of the decoupling rings 5, 6, is considered for improving decoupling of the blower motor 4 from the housing parts 2, 3. These will now be explained in greater detail with reference to the FIGS. 2 to 5.

FIG. 2 shows a top view of the first decoupling ring 5. FIG. 3 shows an associated sectional view along the axis A-A. The first decoupling ring 5 comprises a ring bulge 51, which is dimensioned to fit around a cylindrical extension on the underside 41 of the blower motor 4. Preferably, the ring bulge 51 is dimensioned for an exact fit with the cylindrical extension on the underside 41 of the blower motor 4.

In the present embodiment, the first decoupling ring 5 has eight protrusions 52, which are distributed evenly at a 45° spacing around the decoupling ring 5. In the installed state, the protrusions 52 extend radially away from the blower motor 4 and are slightly tilted in the axial direction and designed as hollow sections. On the outer side, the protrusions 52 are centrally supported in the axial direction by small webs 53, which are formed as support portions of the protrusions 52. The decoupling ring 5 is positioned on the blower motor 5 such that it is slid, ring bulge 51 first, onto the underside 41 of the blower motor 4, wherein the protrusions 52 extend diagonally downward (that is, upside down from the view in FIG. 3). The protrusions 52 thus form a lower support of the blower motor 4 in the inner bottom of the first housing part 2.

In the exemplary embodiment shown, the inner diameter of the ring bulge 51 is about 25 mm, and it is about 3 mm in width. From the base of the ring bulge 51, the decoupling ring 5 opens outward by about 2 mm, wherein the protrusions 52 extend about another 2 mm outward, such that the outer diameter is about 40 mm. The overall height of the decoupling ring 5 is about 9 mm (that is, in assembled state in the axial extension).

A top view of the second decoupling ring 6 is shown in FIG. 4, a side view thereof in FIG. 5. The second decoupling ring 6 has on its topside a ring bulge 61, which is plate-shaped at its base and extends radially outwards forming an edge of plate 62 and then extends further in the axial direction downwards to form a lateral surface 63. The lateral surface 63 bears against the lateral surface of the blower motor 4 in the assembled state, while the ring bulge 61 projects upward from the topside 42 of the blower motor 4 like a collar.

Twelve protrusions 64, 66 extend radially outwards from the lateral surface 63. The ring bulge 61 and the outer circumference of the decoupling ring 6 are flattened at two points (see flat portions 65). This rotationally asymmetric feature allows angularly precise positioning of the second decoupling ring 6 relative to the flat portion 45 of the blower motor 4. One of these flat portions 65 additionally includes steps 67 that extend radially inwards to slightly overlap with the blower motor 4 in the assembled state, and thus provide additional decoupling.

In the area of the flat portions 65, the protrusions 66 are full sections designed as bell-shaped knobs and at a somewhat denser angular spacing. This protects against displacement of the second decoupling ring 6 relative to the blower motor 4 and the housing part 3. Furthermore, the full sections of the protrusions 66 not only allow for an arrangement with a vertical orientation of the shaft 43 but also with a horizontal orientation. The other protrusions 64 are designed as hollow sections. Furthermore, other protrusions 68 extending in the axial direction and designed as partly hollow sections are provided on the edge of plate 62.

In the exemplary embodiment shown, the inner diameter of the ring bulge 61 is about 70 mm, and it is about 3 mm in width. From the base of the ring bulge 61, the edge of plate 62 extends outward by about 5 mm, wherein the protrusions 64 extend about another 3 mm to 4 mm outward. The second decoupling ring thus reaches an outer diameter of about 90 mm. The overall height of the decoupling ring 6 is about 15 mm (that is, in assembled state in the axial extension). The axially oriented protrusions 68 have a height of about 2 mm to 3 mm.

Both decoupling rings 5, 6 are preferably made of the same material. In the exemplary embodiment, this can be an ethylene-propylene-diene rubber, but good results can also be achieved with other synthetic materials. The material thicknesses and dimensions and positioning of the protrusions 52, 64, 66, 68 are coordinated such that the spring stiffness of the first and second decoupling rings 5, 6 in the axial, radial, or normal direction is substantially constant for displacements of the blower motor 4 in the housing arrangement 1 occurring in a first intended operating range. It should be noted that the term "axial radial, or normal" is intended to be an inclusive usage of "or", i.e., refers to only axial, only radial, only normal, both axial and radial, both axial and normal, both radial and normal, or all three of axial, radial, and normal. The same applies to other uses of the term "or" in this disclosure, aside from cases where the alternatives are clearly mutually exclusive options.

Here, the first intended operating range is an expected range of operation for the decoupling rings 5, 6, and may be experimentally, mathematically, or arbitrarily determined in advance. Specifically, in the present disclosure, the operating range of the first and second decoupling rings 5, 6 refers to an expected deformation amount of the decoupling rings 5, 6 in response to motor vibrations or other expected vibrations. In other words, the first intended operating range may be determined based on the maximum speed of the blower motor 4 and any typically occurring external forces or vibrations which influence the vibration behavior of the blower motor 4.

As an example, in the present embodiment, a force was applied to the decoupling rings 5, 6 and the resulting deformation path was measured as axial and radial deformations of up to 2 mm. This deformation range of 0 to 2 mm may be used as the first operating range of the decoupling rings 5, 6. Alternatively, the decoupling rings 5, 6 can be adapted for other operating ranges, for example for displacement ranges between 1 mm and 5 mm, depending on the forces to be expected or the available installation space. The decoupling rings 5, 6 may also be adapted for an operating range defined based on the rotational frequency of the blower motor 4, due to rotational frequency being related to deformations and vibrations in the decoupling rings 5, 6.

Further, it should be noted that the term "substantially constant" with respect to the spring stiffness of the first and second decoupling rings 5, 6 is intended to cover an acceptable amount of deviation in spring stiffness depending on the specific application. For brevity, a substantially constant spring stiffness will simply be referred to as a constant spring stiffness hereinafter. As one example, a constant spring stiffness for the first decoupling ring 5 may be defined as being satisfied when a ratio between the spring stiffness of the first decoupling ring 5 at any two arbitrary points within the first operating range is between 0.5 and 2. As another example, constant spring stiffness for the first decoupling ring 5 may be defined as being satisfied when that ratio is between 0.8 and 1.25.

Here, the two arbitrary points within the first operating range depends on how the first operating range is defined. For instance, if the first operating range is defined as a range of deformation amounts, the two arbitrary points may be selected as two arbitrary amount of deformation for the first decoupling ring 5 within the first operating range. Alternatively, if the first operating range is defined as a range of rotational frequency (or speed) of the blower motor 4, then the two arbitrary points may be selected as two arbitrary rotational frequencies within this expected range of rotational frequency of the blower motor 4.

Similarly, a constant spring stiffness for the second decoupling ring 6 may be defined as being satisfied when a ratio between the spring stiffness of the second decoupling ring 6 at any two arbitrary points within the first operating range is between 0.5 and 2. As another example, constant spring stiffness for the second decoupling ring 6 may be defined as being satisfied when that ratio is between 0.8 and 1.25.

As another example, which may be in addition or as an alternative to the above described conditions, a constant spring stiffness for the overall pair of decoupling rings 5, 6 may be defined as being satisfied when a ratio between the spring stiffness of the first decoupling ring 5 and the spring stiffness of the second decoupling ring 6 over the entire first operating range is between 0.5 and 2, and preferably between 0.8 and 1.25.

Returning to the present embodiment, it was verified for the decoupling rings 5, 6 of the exemplary present embodiment that both spring constants for the decoupling rings 5, 6 were in the range from 30 to 40 N/mm (therefore having a ratio between 0.5 and 2 and satisfying the above exemplary definition of being substantially constant) for an operating range of up to an axial and radial deformation of 2 mm. The blower motor 4 to be mounted has a weight of about 1 kg in this exemplary embodiment. As a result, 12th, 24th, and 36th order vibrations could be significantly reduced.

Next, operational effects of the present disclosure will be explained.

In a typical vehicle climatization device including a blower held in a holder housing, when in operation, the blower vibrations transmit via the holder housing to neighboring components. Structure-borne noise is transmitted to the entire structure, particularly in a vehicle climatization device, which may be considered irritating by, e.g., passengers.

As a comparative reference, consider a configuration in which blower motors are mounted in the housing on their top and bottom sides using simple ring-shaped or cap-shaped decoupling elements made of an elastic material. In this case, rotationally symmetric features of the rotating components (e.g. fan impeller blades) generate a defined number of pulses per revolution, which build up to become higher-order vibrations and can be transmitted to neighboring components. Even though the overall spectral energy of these noises would be acceptable in most cases, their specific frequency may be perceived as irritating. As such, it would be preferable to improve the decoupling of blower motors from surrounding components and to reduce unfavorable noises generated by blower motors, particularly higher-order frequency noises.

In contrast, according to a first aspect of the present disclosure, the housing arrangement includes a first decoupling unit arranged circumferentially between the underside of the blower motor and the inner bottom of the first housing part and a second decoupling unit arranged circumferentially between the topside of the blower motor and the inner surface of the second housing part, and the spring stiffness of the first and the second decoupling units are substantially constant in the axial, radial, or normal directions. The normal direction is the resulting direction in which the respective decoupling unit locally bears against the housing motor. In borderline cases, it can correspond to the axial or radial direction. The spring stiffness is at least substantially constant in the housing arrangement, particularly for displacements of the blower motor occurring in the designated first operating range. It should be noted that the "underside" and "topside" of the blower motor are considered to be those sides through which the rotational axis of the rotation shaft extends. The blower motor itself can actually be installed in an orientation which deviates from this vertical mounting. It can for example be installed horizontally, such that the blower motor is aligned laterally.

The substantially constant spring stiffness of the decoupling units means, first of all, that the decoupling units have a spring constant as defined by Hooke's law. Suspension is therefore soft, such that smaller local displacements of the blower motor in the housing are (almost) completely mitigated by the decoupling units. The arrangement of two of these circumferential decoupling units on the topside and underside and the resilient effect in the axial and radial directions allows uniform vibration isolation towards the outside. Furthermore, this can also be used for compensating minor manufacturing tolerances of the blower motor, the decoupling units, and the housing. The elastic spring region is typically possible within a path length of a few millimeters, while the manufacturing tolerances (even if added up, that is, e.g. positive tolerance for the blower motor, a negative tolerance for the housing) are typically in the submillimeter range. This is in contrast to conventional decoupling devices that assume rather hard damping characteristics where the restoring forces increase disproportionately.

As mentioned, the designated first operating range results particularly from the maximum speed of the blower motor and any typically occurring external forces or vibrations which influence the vibration behavior of the blower motor in the housing. By means of the spring constant, these maximum assumed forces can be assigned to a maximum assumed local displacement of the blower motor in the housing. There can be a second operating range within the designated operating range in which the spring stiffness no longer has to be constant, but at which increased noises are acceptable, e.g. at maximum load or under harsh environmental conditions, such as an off-road ride of the vehicle in which the blower arrangement is installed. Substantially constant spring stiffness means in this context that there is a general linear dependency between the force acting on the decoupling units and the displacement of the blower motor relative to the housing. There can be sporadic smaller deviations.

For a good decoupling effect, including against higher order vibrations, the shape and material of the decoupling units are adapted to achieve specific spring stiffness ratios. Alignment of the spring constants in the axial and radial directions ensures that attenuation which is too soft on one end does not cause shifting of the problem to the other end.

The behavior of the decoupling units as springs in the meaning of Hooke's law can be achieved by various measures. According to an advantageous embodiment, at least one of the decoupling units comprises a multitude of radially distributed protrusions facing away from the motor. The protrusions preferably have a tapering material profile, particularly a bell profile. This facilitates developing a suspension.

Various materials are known for use for the decoupling units, including elastic polymers. Synthetic materials or natural polymers such as rubber can be used for this purpose. For example, an ethylene-propylene-diene rubber can be used. These materials are so elastic that the protrusions formed thereupon can be specified as having a length between 1 mm and 10 mm, preferably between 2 mm and 6 mm. This on the one hand provides a sufficiently long spring travel, on the other hand it does not significantly increase the installation space required.

According to embodiment variants, one or more of such protrusions have a hollow section. This improves the resilient mounting.

Preferably, protrusions in the radial direction as well as protrusions in the axial direction are provided, e.g. they are alternately facing away from the motor in the axial and radial directions. This facilitates developing a suspension in all directions.

According to another embodiment, at least one of the decoupling units can comprise two layers of material with different elasticity to support the resilient effect.

According to an advantageous embodiment, the first and second decoupling units are each formed as circumferential elastic rings. This makes assembly easier. Alternatively, these units may comprise multiple parts and consist of two half rings, for example.

Rotationally asymmetric features are known as such to prevent mounting errors and to ensure a defined positioning of the decoupling units relative to the housing and blower motor. According to an embodiment, both the blower motor and the decoupling unit designed as a ring include at least one such rotationally asymmetric feature adapted thereto, such that a correct positioning in the rotational direction between blower motor and said decoupling unit is predetermined. Furthermore, protrusions are provided as full sections in the area of the rotationally asymmetric feature to prevent breaking out in the area of the rotationally asymmetric feature. Tests have shown that, while hollow sections are more effective for providing soft suspension, they enable breaking out of the blower motor from the decoupling unit in the area of rotationally asymmetric features, particularly in flat portions with respect to a circular shape. It is therefore particularly favorable to provide both hollow sections and full sections.

The invention claimed is:

1. A housing arrangement, comprising:
    a blower motor including a rotation shaft that traverses through an underside and a topside of the blower motor, the rotation shaft being configured to mount a fan impeller thereupon;
    a first housing part that receives the blower motor;
    a second housing part that covers the blower motor received in the first housing part;
    a first decoupling unit arranged circumferentially between the underside of the blower motor and an inner bottom of the first housing part; and
    a second decoupling unit arranged circumferentially between the topside of the blower motor and an inner surface of the second housing part, wherein
    the spring stiffness of the first and the second decoupling units are substantially constant in an axial direction, a radial direction, or a normal direction,
    at least one of the first and second decoupling units includes a plurality of radially distributed protrusions oriented away from the blower motor, and
    one or more of the protrusions has a hollow profile.

2. The housing arrangement according to claim 1, wherein a ratio between the spring stiffness of the first decoupling unit at any two arbitrary points within a designated first operating range of the first decoupling unit is between 0.5 and 2, wherein the designated first operating range is determined by a threshold maximum assumed deformation range of the first decoupling unit.

3. The housing arrangement according to claim 1, wherein a ratio between the spring stiffness of the first decoupling unit at any two arbitrary points within a designated first operating range of the first decoupling unit is between 0.8 and 1.25, wherein the designated first operating range is determined by a threshold maximum assumed deformation range of the first decoupling unit.

4. The housing arrangement according to claim 1, wherein a ratio between the spring stiffness of the second decoupling unit at any two arbitrary points within a designated first operating range of the second decoupling unit is between 0.5 and 2, wherein the designated first operating range is determined by a threshold maximum assumed deformation range of the second decoupling unit.

5. The housing arrangement according to claim 1, wherein a ratio between the spring stiffness of the second decoupling unit at any two arbitrary points within a designated first operating range of the second decoupling unit is between 0.8 and 1.25, wherein the designated first operating range is determined by a threshold maximum assumed deformation range of the second decoupling unit.

6. The housing arrangement according to claim 1, wherein a ratio between the spring stiffness of the first decoupling unit and the spring stiffness of the second decoupling unit is between 0.5 and 2 over an entire designated first operating range of the first and second decoupling units, wherein the entire designated first operating range is determined by a threshold maximum assumed deformation range of the first decoupling unit and the second decoupling unit.

7. The housing arrangement according to claim 1, wherein a ratio between the spring stiffness of the first decoupling unit and the spring stiffness of the second decoupling unit is between 0.8 and 1.25 over an entire designated first operating range of the first and second decoupling units, wherein the entire designated first operating range is determined by a threshold maximum assumed deformation range of the first decoupling unit and the second decoupling unit.

8. The housing arrangement according to claim 1, wherein at least one of the first and second decoupling units is made of an elastic polymer, and the protrusions protrude between 1 mm and 10 mm.

9. The housing arrangement according to claim 1, wherein the plurality of protrusions include protrusions that protrude in the radial direction as well as protrusions that protrude in the axial direction.

10. The housing arrangement according claim 1, wherein at least one of the first and second decoupling units includes at least two layers of material of different elasticity.

11. The housing arrangement according to claim 1, wherein the first and second decoupling units are each formed as circumferential elastic rings.

12. The housing arrangement according to claim 11, wherein the blower motor includes at least one rotationally asymmetric feature that is in contact with a particular decoupling unit among the first and second decoupling units,
the particular decoupling unit, formed as a ring, includes a corresponding rotationally asymmetric feature so as to prescribe a predetermined positioning in the rotational direction between the blower motor and the particular decoupling unit, and within an area of the rotationally asymmetric feature of the particular decoupling unit, at least one protrusion is provided as a full section of the area corresponding to the asymmetric feature.

13. A vehicle climatization device, comprising:
a housing arrangement according to claim 1.

14. The housing arrangement according to claim 1, wherein
there is a linear dependency between a force acting on the first and the second decoupling units and a displacement of the blower motor relative to the housing arrangement.

\* \* \* \* \*